United States Patent
Gershenson et al.

(10) Patent No.: US 8,987,598 B1
(45) Date of Patent: Mar. 24, 2015

(54) CORROSSION RESISTANT MINESWEEPING CABLE

(71) Applicants: Meir Gershenson, Panama City, FL (US); Leslie Y. Lugo, Panama City, FL (US)

(72) Inventors: Meir Gershenson, Panama City, FL (US); Leslie Y. Lugo, Panama City, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 105 days.

(21) Appl. No.: 13/671,009

(22) Filed: Nov. 7, 2012

(51) Int. Cl.
*H01B 7/12* (2006.01)
*H02G 15/02* (2006.01)
*B63G 9/00* (2006.01)
*B41B 1/04* (2006.01)

(52) U.S. Cl.
USPC ............ 174/110 R; 174/15 C; 174/110 F; 174/113 R; 174/115

(58) Field of Classification Search
CPC ..... H02G 9/00; H02G 15/076; H02G 3/0481; H01B 1/02; H01B 7/0009; H01B 7/02; H01B 7/0208; H01B 7/0225; H01B 7/0266; H01B 7/17; H01B 7/28; H01B 7/045; H01B 7/14; H01B 7/223; H01B 7/2806; H01B 9/04; H01R 3/00; H01R 4/12; B63G 7/04; B63G 7/06

USPC .............................. 174/110, 110 R
See application file for complete search history.

(56) References Cited

U.S. PATENT DOCUMENTS

| | | | | |
|---|---|---|---|---|
| 2,396,734 A * | 3/1946 | Williams, Jr. | ............... | 174/128.1 |
| 2,419,591 A * | 4/1947 | Quigley | ............... | 174/128.1 |
| 3,616,868 A * | 11/1971 | Bassinger | ............... | 175/92 |
| 4,508,934 A * | 4/1985 | Feldman, Jr. | ............... | 174/101.5 |
| 4,535,716 A * | 8/1985 | Hill | ............... | 114/221 R |
| 4,582,582 A * | 4/1986 | Gibbard | ............... | 204/193 |
| 4,676,168 A * | 6/1987 | Cotton | ............... | 102/402 |
| 4,697,522 A * | 10/1987 | Groschupp et al. | ............... | 102/402 |
| 5,235,137 A * | 8/1993 | Jones et al. | ............... | 174/101.5 |
| 8,403,519 B2 * | 3/2013 | Napier et al. | ............... | 362/184 |

* cited by examiner

*Primary Examiner* — Timothy Thompson
*Assistant Examiner* — Michael F McAllister
(74) *Attorney, Agent, or Firm* — James T. Shepherd

(57) ABSTRACT

An improved corrosion-resistant magnetic influence minesweeping cable is provided. The cable produces a magnetic field that simulates a ship's magnetic signature as the ship passes through the sea. It has an outer anode conductor made of titanium-clad copper with mixed metal oxide at its aft end, an outer cathode conductor made of nickel-clad copper at its forward end, an inner conductor made of aluminum that runs the length of the cable, and a steel core strength member that also runs the length of the cable. The outer anode conductor is in electrical contact with the inner conductor. The outer cathode conductor is insulated from the inner conductor. The outer cathode conductor and the inner conductor can be connected to an electrical power source onboard a towing vessel.

13 Claims, 2 Drawing Sheets

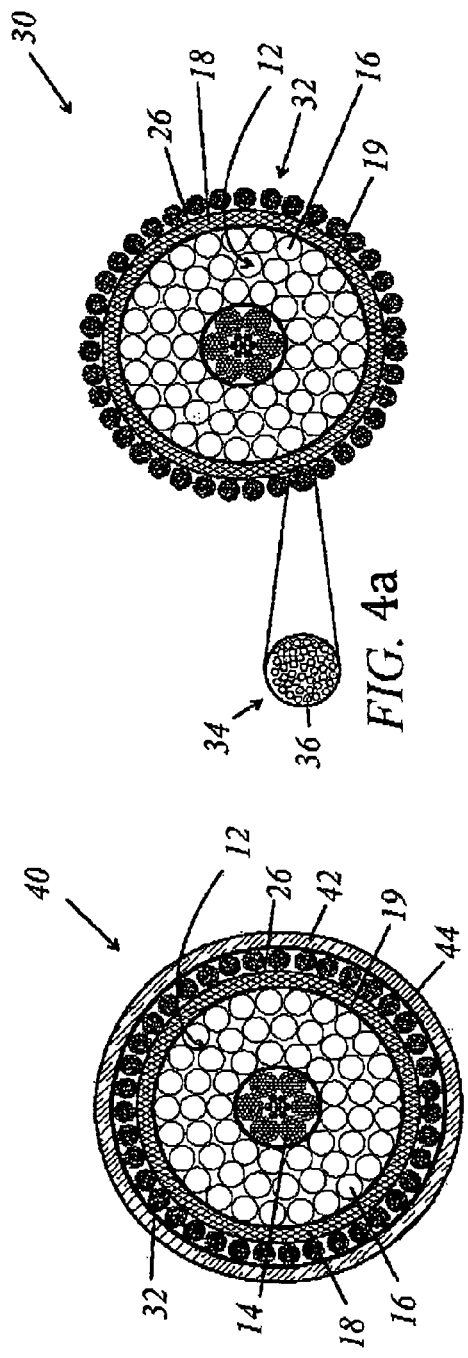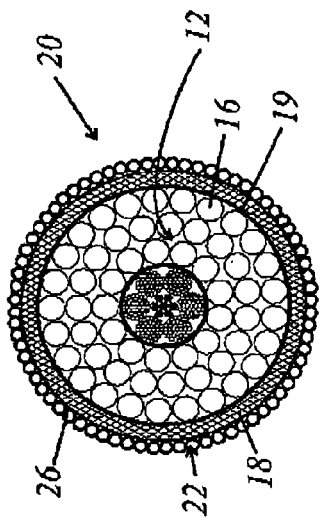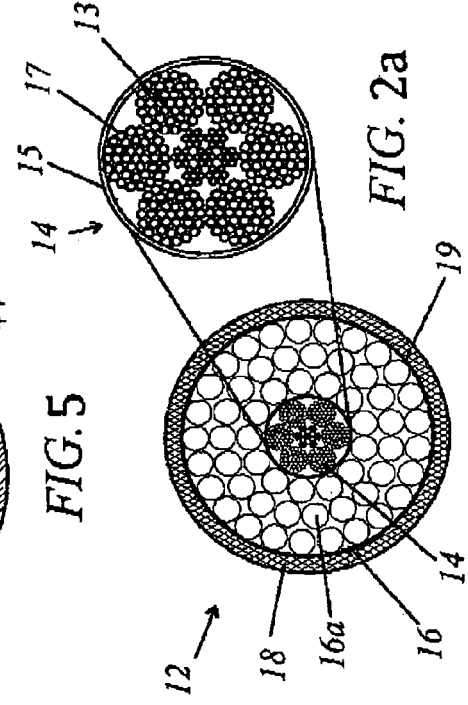

CORROSSION RESISTANT MINESWEEPING CABLE

STATEMENT OF GOVERNMENT INTEREST

The invention described herein may be manufactured and used by or for the Government of the United States of America for Governmental purposes without the payment of any royalties.

BACKGROUND OF THE INVENTION

1. Field of the Invention

The present invention relates generally to minesweeping, and in particular to minesweeping using a magnetic influence cable that is capable of simulating the magnetic signature of a ship passing through saltwater, therein causing influence mines to detonate when they sense the created magnetic signature. The magnetic influence cable is typically deployed from a tow vehicle in a seawater environment, so it is desirable that the cable have good resistance to corrosion due to air, sun, salt, water, and the presence of an electrical current.

2. Prior Art

There are many types of mines used to damage and destroy marine vessels. Magnetic influence mines detonate on sensing a change in the ambient magnetic field. The proliferation of relatively inexpensive mines makes Mine Countermeasures (MCM) a necessary and expensive challenge to counter the proliferation. Minesweeping has historically been conducted by ships with nonmagnetic bottoms (i.e. wood, fiberglass). However, even ships with a nonmagnetic bottom have a magnetic signature, and this magnetic signature can be detected by influence mines having a sensor that detects changes in the magnetic environment. More recently, aircraft (helicopters) and remotely controlled unmanned vessels have been employed to conduct minesweeping.

Examples of minesweeping methods include mechanical sweeps, acoustic sweeps, and magnetic sweeps. Mechanical sweeps are designed to sever the cables of moored mines with explosives or abrasives. Acoustic sweeps are typically used to locate the positions of mines, which can then be neutralized, typically by explosives. Magnetic sweeps typically simulate a ship's magnetic signature, thus causing the mine to detonate.

Magnetic influence minesweeper methods generate an electromagnetic current to create a magnetic field that simulates the magnetic signature created by the passage of a ship, thus "tricking" the magnetic influence mine to detonate. A node in the electromagnetic current typically is an electrode connected to a cable that is towed by a vessel or helicopter, usually in saltwater. Saltwater is conductive, and thusly can act as a leg in an electrical circuit when conducting a magnetic sweep. Saltwater is also corrosive, and it is especially corrosive to electrodes, where the electrode is in contact with an electrical current, saltwater, sun, and air. With open loop sweeps, the electrodes are in contact with at least three of these.

The rapid corrosion experienced by these prior art electrodes require frequent replacement of the aft electrode, which requires a connector between the said electrode and the rest of the cable to facilitate the removal and replacement of the electrode. However, the connector itself is subject to frequent failures from fatigue due to the constant movement of the joint in the seawater during towing operations as well as stresses placed on the joint when it is wound around the winch when stowed. Additionally, these connectors are bulky relative to the rest of the cable and can cause snagging and other associated problems when the cable is being wound around the winch during deployment or stowage operations. This is especially problematic when the cable is being deployed from an unmanned minesweeping vessel, where there are no personnel onboard to "unsnagged" or otherwise correct the problem.

SUMMARY OF THE INVENTION

Thus, it is an object of the invention to provide a continuous-length, corrosion-resistant minesweeping cable that significantly improves the life of the electrode and that is particularly suitable for use on unmanned minesweeping vessels.

The invention, in one aspect, is an improved magnetic influence cable for producing a magnetic field in saltwater that simulates a ship's signature as it passes through the water. The magnetic influence cable produces the simulated signature when, as it is pulled through the saltwater, an electric current is provided, where the current passes through the magnetic influence cable and the ambient saltwater. The improved magnetic influence cable of the invention has much better corrosion resistance than prior art cables.

In general, the magnetic influence cable has good flexibility, made possible through the use of wires of twisted bundles of fine strands, twisted wires, sheaths of twisted wires, rubber insulators, and elastic jackets.

The magnetic influence cable is coaxial, having at its core an inner conductor cable with a coaxial arrangement. The inner conductor cable extends the full length of the magnetic influence cable and has a core axial strength member, which is typically wrapped with a separator, an inner conductor, and a perimeter insulation layer. The inner conductor of the inner conductor cable comprises a plurality of circular threads of aluminum. On average there are about 60 circular threads twist-wound around the strength member. In operation, the inner connector is connected to an electrical power source onboard the minesweeping vessel, such as a generator.

The insulation is a resilient, non-conducting, waterproof material. The insulation is adhered to the inner conductor with a first binder. The first binder is selected to have excellent adhesion to the aluminum inner conductor and the insulation. The insulation in one embodiment is about 0.3 inches thick.

An aft portion of the magnetic influence cable has an aft electrode, which is typically the anode, where electrons are collected from the ambient saltwater, and passed on to the inner conductor. The aft electrode is relatively long, typically in the range of about 9% to about 18% of the total length of the magnetic influence cable. The aft electrode is typically an outer anode conductor having an exposed sleeve-like layer of a plurality of twisted conductive wires laid side-by-side and embedded in the outer perimeter of the insulation of the inner conductor cable. Each wire is at least one strand of an electrically conductive material. The aft electrode conductive material is composed of titanium-clad copper, where the titanium is coated with mixed metal oxides (MMO). This material combination has better corrosion resistance than pure aluminum.

A forward portion of the magnetic influence cable has a forward electrode, where the forward electrode is typically a partially exposed outer cathode conductor that is connected to an electrical power source onboard the minesweeping vessel. The forward electrode has an exposed sleeve-like layer of a plurality of twisted conductive bundles of strands laid side-by-side and embedded in the outer perimeter of the insulation of the inner conductor cable. The forward electrode typically provides electrons to the ambient saltwater, where the electrons move through the conductive saltwater toward the aft electrode. The forward electrode is also relatively long, typically in the range of about 7% to about 15% of the total length of the magnetic influence cable.

Forward of the cathode the outer cathode conductor is covered with a protective jacket, forming a jacketed section of the magnetic influence cable designated as the link cable section. The outer cathode conductor and the inner conductor of the link cable section are in electrical connection with the generator or whatever source is supplying the electrical current onboard the ship or other vessel that is towing the cable through the seawater. The outer cathode conductor is a layer of a plurality of a twisted bundle of strands of an electrically conductive material laid side-by-side. The forward electrode conductive material is selected from copper-clad aluminum, tinned copper, pure copper and nickel clad copper. All of these materials have better corrosion resistance than pure aluminum. In the preferred embodiment, the forward electrode comprises nickel-clad copper, which provides a good compromise of cost, performance and corrosion resistance.

Therefore, the improved combination of materials for the magnetic influence cable is one where the aft electrode is composed of titanium-clad copper, where the titanium is coated with mixed metal oxides which improve the conductivity of the titanium, and the forward electrode is composed of nickel-clad copper.

The jacket material used in the link-cable section is an insulation material similar to that used to cover the inner conductor cable.

BRIEF DESCRIPTION OF THE DRAWINGS

The foregoing invention will become readily apparent by referring to the following detailed description and the appended drawings in which:

FIG. 2 is a cross-sectional view of the inner conductor cable, which is also representative of the S-cable section of the magnetic influence cable illustrated in FIG. 1;

FIG. 2a is an enlarged cross-sectional view of the strength member of the inner conductor cable illustrated in FIG. 2;

FIG. 3 is a cross-sectional view of the aft electrode of the magnetic influence cable illustrated in FIG. 1;

FIG. 4 is a cross-sectional view of the forward electrode of the magnetic influence cable illustrated in FIG. 1;

FIG. 4a is an enlarged cross-sectional view of a slightly twisted cathode bundle of strands 36 of a cathode corrosion resistant conductive material; and FIG. 5 is a cross-sectional view of the link cable section of the magnetic influence cable illustrated in FIG. 1.

DETAILED DESCRIPTION OF THE INVENTION

Figure 1:
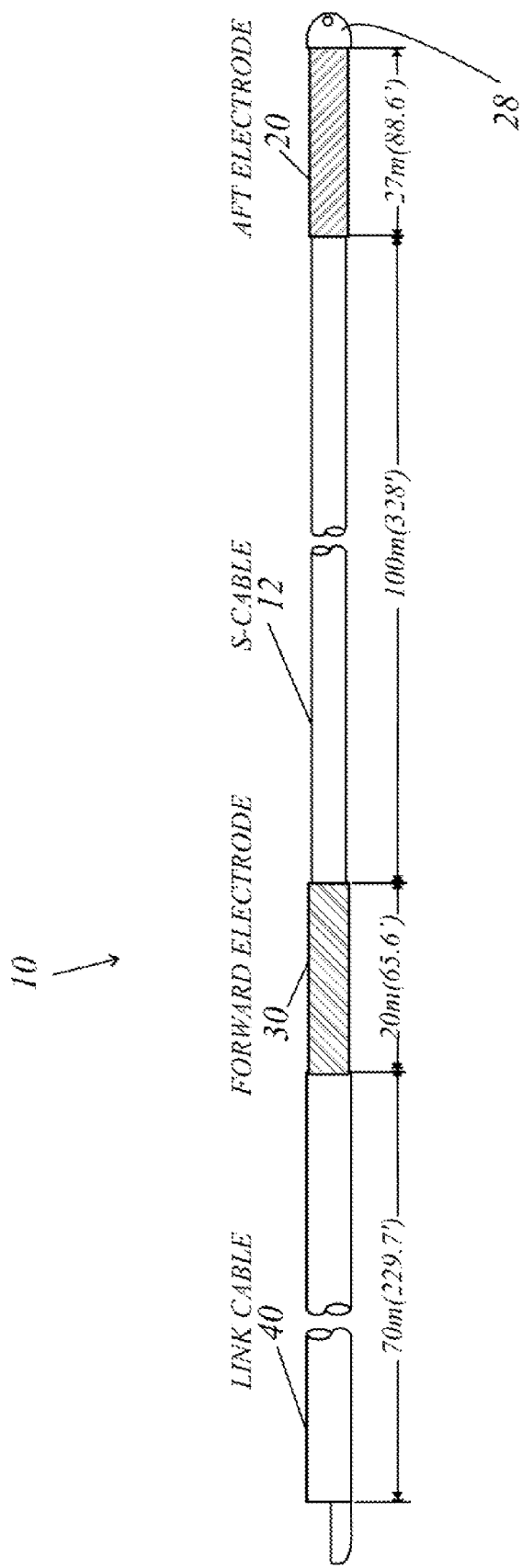
FIG. 1 is a side view of an embodiment of the magnetic influence cable.

The invention is a magnetic influence cable that has improved corrosion resistance, wherein the sweep cable is a component of a minesweeping system utilized in a seawater environment. The illustrated magnetic influence cable is particularly suitable for open loop influence mine sweeping. Open loop influence mine sweeping produces a magnetic field in saltwater that simulates a ship's magnetic signature as it passes through the water. A simulated signature is created when, as the cable is pulled through the saltwater, the cable is energized with an electric current and uses the water as a conductor to produce a magnetic field. In an open loop configuration, electrons flow from a forward electrode, through the ambient saltwater, and are collected by the aft electrode, which is in electrical connection with the cable. Alternatively, one can describe this same current in terms of protons, where the current flows from the aft electrode through the saltwater and to the forward electrode. However one views current, for purposes of this disclosure, the aft electrode is an anode and the forward electrode is a cathode.

FIG. 1 provides a side view of an embodiment of the magnetic influence cable 10. As will be discussed, the materials selected in the illustrated embodiment are unique for a minesweeping cable. The coaxial cable 10 has four named sections: The S-cable 12, the aft electrode 20, the forward electrode 30, and the link-cable 40. While the following description describes each section separately, it should be understood that one or more components of each section is actually a single continuous section that runs through all four sections (for example, the strength member 14, inner conductor 16, and insulation layer 18) as described further herein below. In the preferred embodiment, the S-cable section 12 has a length within the range of about 90 meters to about 120 meters. The nominal length is 100 meters, with a nominal diameter of about 1.06 inches and nominal weight of 310.6 lbs. The link-cable section 40 has a length within the range of about 60 meters to about 100 meters. The nominal length is 70 meters, with a nominal diameter of about 1.37 inches and nominal weight of 456.4 lbs. The aft electrode 20 is about 9% to about 15% of the overall length of the magnetic influence cable 10, where the nominal overall length is about 217 meters. The length of the aft electrode ranges from about 19.5 meters to about 32.5 meters. The nominal length of the aft electrode 20 is about 27 meters, with a nominal diameter of about 1.19 inches and nominal weight of 141.6 lbs. The forward electrode 30 is about 7% to about 15% of the overall length of the magnetic influence cable 10. The nominal length of the forward electrode 30 is about 20 meters, with a nominal diameter of about 1.24 inches and nominal weight of 116.6 lbs. It should be noted, however, that the lengths, diameters, and weights cited above are exemplary and may vary outside of the cited ranges without departing from the scope of the invention.

The materials selected for the electrodes exposed to saltwater are resistant to corrosion from salt, water, air and sunlight, as well as from the current's electromagnetic field (EMF).

FIG. 2 provides a cross-sectional view of the S-cable section of the magnetic influence cable illustrated in FIG. 1, where the S-cable section consists solely of the inner conductor cable 12 which runs the full length of the magnetic influence cable 10 and is a common element in all four sections described herein. The inner conductor cable 12 has a core axial strength member 14 which is wrapped with a separator 15, an inner conductor 16, a binder 19, and a covering insulation 18. As illustrated in FIG. 2a, the strength member 14 is composed of wires that are slightly twisted bundles 13 of strands 17 of a high strength material. In the illustrated embodiment, there is a center bundle and six surrounding bundles. In the illustrated embodiment, the high strength material includes steel and other alloys. If steel is used, galvanized steel is preferable, as it is more resistant to surface corrosion. The separator 15 is a thin, water-resistant material having electrical insulation properties.

The inner conductor 16 of the inner conductor cable 12 comprises a plurality of threads 16a of aluminum. Typically, there are about 60 threads 16a twist-wound around the strength member 14. In operation, the inner connector 16 is connected to an electrical power source onboard the minesweeping vessel, such as a generator.

The insulation 18 comprises a resilient, non-conducting, waterproof material that is adhered to the inner conductor 16 with a first binder 19. The first binder 19 is selected to have excellent adhesion to the aluminum inner conductor 16 and the insulation 18. Selection of the insulation 18 material can vary based upon the desired properties (operational temperature, abrasion resistance, weathering properties, etc). The insulation 18 in the preferred embodiment is about 0.3 inch thick and is composed of extruded polyperfluoroalkoxyethylene (PFA), such as Symalit® 1000 PFA manufactured by Quadrant Engineering Plastics Products of Reading, Pa.

FIG. 3 is a cross-sectional view of the aft electrode 20 of the magnetic influence cable 10 illustrated in FIG. 1. The aft electrode 20 coaxial section includes the inner conductor cable 12, and an outer anodic conductor 22 having an exposed sleeve-like layer of conductive wires laid side-by-side and embedded in the outer perimeter 26 of the insulation 18 of the inner conductor cable 12. The outer anodic conductor 22 is placed in electrical connection with the inner conductor 16. This can be done by making a watertight electrical connection between the outer anodic conductor 22 and the inner conductor 16 via a series of electrically conducting connectors (not shown) applied at areas of the cable where the insulation 18 has been removed. These connectors are applied in a way as to seal against the insulation 18, preventing water intrusion to conductor 16, while at the same time facilitating the conduction of electricity.

After testing multiple aft electrode conductive materials for the anode, the best overall corrosion resistance that was acceptable in terms of cost versus performance was provided by titanium-clad copper, where the titanium cladding is coated with mixed metal oxides (MMO). The mixed metal oxide (MMO) coating is highly conductive, corrosion-resistant and acid-resistant and it is added to the titanium as an electrocatalyst to improve conductivity and resistance to acidic environments. In the preferred embodiment, the MMO comprises iridium oxide ($IrO_2$) and tantalum oxide ($Ta_2O_5$). The wires of anodic conductor 22 can be, for example, Optima™ Anodes manufactured by Siemens Water Technologies Corp. of Union, N.J.

FIG. 4 is a cross-sectional view of the forward electrode 30 illustrated in FIG. 1. This coaxial section includes the inner conductor cable 12 previously described with inner conductor 16 and a bare portion of an outer cathode conductor 32 having an exposed sleeve-like layer of twisted conductive bundles 34 laid side-by-side and embedded in the outer perimeter 26 of the insulation 18 of the inner conductor cable 12. As shown in FIG. 4a, the exposed sleeve-like layer is composed of a plurality of slightly twisted cathode bundles 34 of strands 36 of a cathode corrosion resistant conductive material. The forward electrode 30 coaxial section is substantially two conductors 16, 32 surrounding a strength member 14. The inner conductor 16 is typically aluminum and has an insulating layer 18 to separate it from the outer cathode conductor 32. The outer cathode conductor 32 is insulated from the inner conductor 16, and is comprised of nickel-clad copper. The outer cathode conductor 32 extends to the forward end of the magnetic influence cable and, in operation, is connected to an electrical power source onboard the minesweeping vessel, such as a generator.

FIG. 5 is a cross-sectional view of the link cable section 40 of the magnetic influence cable 10 illustrated in FIG. 2. The link-cable section is substantially a jacketed portion of the forward electrode, having an insulating jacket 42 adhered with a second binder 44 to the outer cathode conductor 32. The jacket 42 extends to the forward end of the magnetic influence cable 10.

By the numbers, the link-cable section 40 is substantially the inner conductor cable 12 having the previously described inner conductor 16, an outer cathode conductor 32 having a sleeve-like layer of a plurality of slightly twisted cathode bundles 34 of strands 36 of a cathode corrosion resistant conductive material laid side-by-side and embedded in the outer perimeter 26 of the insulation 18 of the inner conductor cable 12. The two conductors 16, 32 surround the strength member 14. The inner conductor 16 is aluminum with first binder 19, and an insulating layer 18 separates it from the outer cathode conductor 32. The outer cathode conductor 32 is typically a nickel-clad copper conductor. The link-cable section is insulated with a watertight jacket 42, which is similar to insulation material 18 used on the inner conductor cable. The watertight jacket 42 is adhered to the outer cathode conductor 32 with a second binder 44. The second binder 44 is selected to have excellent adhesion to the outer cathode conductor 32 and the jacket 42. The link-cable section is a jacketed portion of the forward electrode comprised of an insulating jacket adhered with a second binder to the outer cathode conductor, wherein said jacket extends to the forward end of the magnetic influence cable.

This improved magnetic influence cable resists corrosion better than prior art cables while operating in seawater. A high current loop between the two electrodes, using the seawater as a conductor, produces an effective simulation of a ship's magnetic signature, but the environment is typically very corrosive. The open-loop process accelerates corrosion of the metals used as exposed electrodes in the prior art cables in typical minesweeping operations. The invented cable described herein has a combination of materials that provides the same magnetic signature output as the prior art cables, but with much diminished corrosion, allowing the cable to be used significantly longer. Another advantage of the invented magnetic influence cable is that there are no bulky connectors at the electrodes that can break or impede winch operations, as has been experienced with the prior art cables. Yet another advantage of the invented magnetic influence cable is that the cost of fabrication is comparable to previously used systems, which typically have all-aluminum cables. Because of the longer operational life of the new cable, the operational cost of this cable is greatly reduced as compared with the previous cables.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. A magnetic influence cable for minesweeping operations, said cable comprising:

a coaxial inner conductor cable having an aft portion and a forward portion, said inner conductor cable comprised of a core strength member with a perimeter separator, an inner conductor having a plurality of twisted threads of aluminum, a first binder, and a covering insulator having an outer perimeter, said covering insulator being adhered to the inner conductor by said first binder, wherein said inner conductor cable extends substantially through the entire length of the magnetic influence cable;

an aft electrode comprised of an outer anode conductor having an exposed conductive layer of a plurality of twisted conductive wires, said conductive layer embedded in said covering insulator at said aft portion of said inner conductor cable, wherein said aft electrode is in electrical connection with said inner conductor;

a forward electrode having a forward portion, said forward electrode comprising an outer cathode conductor having an exposed conductive layer of a plurality of twisted conductive bundles of strands embedded in said covering insulator at said forward portion of said inner conductor cable, wherein said forward electrode is electrically insulated from said inner conductor, and said outer cathode conductor extends to a forward end of the magnetic influence cable; and an insulating jacket covering said forward portion of said forward electrode and adhered thereto by a second binder, wherein said jacket extends to the forward end of the magnetic influence cable.

2. The magnetic influence cable according to claim 1, wherein said outer anode conductor is comprised of titanium-clad copper with mixed metal oxide.

3. The magnetic influence cable according to claim 1, wherein said outer cathode conductor is comprised of nickel-clad copper.

4. The magnetic influence cable according to claim 1, wherein said covering insulator is a resilient, non-conducting, waterproof material.

5. The magnetic influence cable according to claim 4, wherein said insulating jacket is comprised of a resilient, non-conducting, waterproof material.

6. The magnetic influence cable according to claim 1, wherein said strength member comprises a high tensile material.

7. The magnetic influence cable according to claim 1, wherein said strength member is comprised of steel.

8. The magnetic influence cable according to claim 7, wherein said steel is galvanized steel.

9. The magnetic influence cable according to claim 1, wherein the magnetic influence cable has an overall length that is greater than 200 meters and less than 250 meters.

10. The magnetic influence cable according to claim 9, wherein said forward electrode has a length in the range of about 7% to about 15% of said overall length of the magnetic influence cable.

11. The magnetic influence cable according to claim 9, wherein said aft electrode has a length in the range of about 9% to about 18% of said overall length of the magnetic influence cable.

12. The magnetic influence cable according to claim 1, wherein said inner conductor is comprised of about 60 threads of aluminum.

13. The magnetic influence cable according to claim 1, wherein said aft electrode is connected to said inner conductor via one or more electrically-conductive connectors sealably extending through said covering insulator to prevent water intrusion to said inner conductor.

* * * * *